Figure 1:
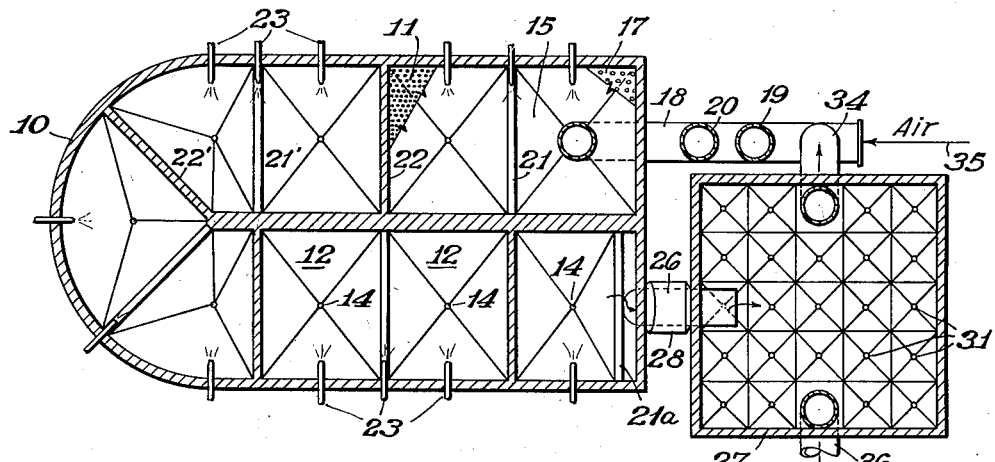

Jan. 16, 1951 J. F. COFFEY 2,538,235
HYDROGEN MANUFACTURE
Filed April 18, 1945 2 Sheets-Sheet 1

Inventor:-
Joseph F. Coffey
By Donald E. Payne
Attorney

Patented Jan. 16, 1951

2,538,235

UNITED STATES PATENT OFFICE 2,538,235

HYDROGEN MANUFACTURE

Joseph F. Coffey, Chicago, Ill., assignor to Standard Oil Company, Chicago, Ill., a corporation of Indiana Application April 18, 1945, Serial No. 588,959

9 Claims. (Cl. 23—212)

This invention relates to the manufacture of hydrogen and it pertains more particularly to improved methods and means for generating relatively pure hydrogen or mixtures of hydrogen and carbon monoxide of constant composition in a continuous process employing fluidized solids technique.

In the well-known water-gas reaction steam is passed through a bed of highly heated carbon to produce primarily hydrogen and carbon monoxide, but as the temperature of the bed decreases (the reaction being endothermic) more and more carbon dioxide comes over in the product stream. After three or four minutes carbon dioxide may exceed carbon monoxide in the product stream and it is necessary to blow the bed with air to bring it back to the desired high temperature. This cyclic operation and the constantly changing product composition are both undesirable. An object of my invention is to provide a continuous process which will produce a hydrogen product stream or a mixed hydrogen-carbon monoxide stream of substantially constant composition.

In prior methods for producing hydrogen the water-gas reaction had to be followed by a subsequent catalytic treatment of the product stream with steam in order to oxidize the carbon monoxide in the water-gas and the resulting carbon dioxide then had to be removed from the hydrogen. An object of my invention is to produce substantially pure hydrogen in a single step and to thus avoid the necessity of subsequent catalytic treating and separation steps. Another object is to produce a hydrogen substantially free from contaminants, particularly sulfur contaminants and contaminants heretofore introduced in the blowing step.

A further object is to provide a method and means for generating hydrogen which will require a minimum capital investment and operating cost. A further object is to effect a more efficient utilization of heat and to avoid the necessity of using large amounts of process steam. A further object is to provide a system which is easy to construct and simple to operate. Other objects will be apparent as the detailed description of the invention proceeds.

In practicing my invention I employ a circulating system of finely divided solids consisting chiefly of calcium carbonate, calcium oxide and carbon. When coal is employed the solids will also include ash. Throughout the system such solids are maintained in suspended dense phase fluent condition and may be visualized as a liquid-like mass the composition of which in any particular part of the system being substantially constant but the composition in the reactor being radically different than in the calciner. In the calciner I utilize the reactions:

(1) $2C + O_2 \rightarrow 2CO + heat$ (primary combustion)
(2) $2CO + O_2 \rightarrow 2CO_2 + heat$ (secondary combustion)
(3) $CaCO_3 + heat \rightarrow CaO + CO_2$ In the reactor I employ the reactions:

(4) $C + H_2O$ (vapor) $+ heat \rightarrow CO + H_2$
(5) $CO + H_2O$ (vapor) $\rightarrow CO_2 + H_2 + heat$
(6) $CaO + CO_2 \rightarrow CaCO_3 + heat$ The above reactions are, of course, dependent upon the maintenance of proper temperature conditions in the calciner and the reactor respectively. By removing $CO_2$ with CaO in reaction (6) the equilibrium in reaction (5) is displaced to the right to reduce or substantially eliminate, whichever is desired, the amount of CO in the product gas. By operating the calciner at 1400° to 2100° F., e. g. about 1600° F., and at about atmospheric pressure, and by burning the carbon monoxide from reaction (1) to carbon dioxide, i. e. carrying out reaction (2), in the upper part of the calcining zone, the net conversion products in the calciner will be chiefly CaO and $CO_2$. By operating the reactor at approximately the same pressure but at a temperature within the range of about 800 to 1200° F., e. g. about 1000° F., and in the presence of sufficient CaO, the gaseous product stream will consist chiefly of hydrogen. The equilibrium product compositions for temperatures of 800, 1000 and 1200° F. are substantially as follows:

*Composition of gases resulting from treatment of carbon with steam in presence of lime*

| Temperature, °F. | Item | Composition, Per cent | | |
|---|---|---|---|---|
| | | 1 atm. | 2 atm. | 20 atm. |
| 800 | CO | | | |
| | $CO_2$ | | | |
| | $H_2$ | 99.03 | 98.63 | 95.86 |
| | $H_2O$ | .97 | 1.37 | 4.14 |
| 1000 | CO | .34 | .12 | .0038 |
| | $CO_2$ | .10 | .06 | .0058 |
| | $H_2$ | 94.92 | 92.57 | 80.19 |
| | $H_2O$ | 4.64 | 7.25 | 19.80 |
| 1200 | CO | 7.08 | 2.50 | .08 |
| | $CO_2$ | 1.90 | .95 | .095 |
| | $H_2$ | 83.84 | 86.12 | 71.625 |
| | $H_2O$ | 7.18 | 10.43 | 28.200 |

Since most coal contains small amounts of sulfur and nitrogen compounds the hydrogen produced in my system may sometimes be contaminated with very small amounts of nitrogen and H₂S, but substantially all of the nitrogen is eliminated from the system with flue gases from the calciner and sulfur is removed in flue gas as SO₂ and/or converted to inert calcium sulfate which is discarded with other solids discharged from the system. The water content of the product hydrogen can, of course, be simply and readily removed by any conventional condensing and/or drying means.

The calciner is preferably a shallow U-shaped vessel constructed of heat-resistant refractory material and provided at its base with refractory porous plates for the introduction of sufficient air to maintain the solids in fluidized dense phase condition and to effect a part of the necessary burning. About four parts by weight of fluidized solids may be recycled in the system for each part by weight introduced thereto as make-up and the make-up may consist of approximately one part by weight of limestone to four parts by weight or more of coal. All of these solids are preferably of finely divided form having a particle size ranging, for example, from about 20 to 400 mesh. About half of the air required for combustion is introduced at the bottom of the bed through porous diffusor plates and it serves the function of maintaining the solids in fluidized condition while reacting with the coal to produce carbon monoxide. The other half of the air is introduced above the bed to burn the carbon monoxide to carbon dioxide and to heat the bed by radiation. In the calciner make-up calcium carbonate (limestone) is added and along with the calcium carbonate from the reactor it is converted into calcium oxide.

All of the coal required in the system is introduced into the calciner, a part being burned to supply the heat of calcination and the remainder being preheated and partially coked before being introduced into the reactor. By this procedure the methane, tar, sulfur compounds and other products of coal coking are largely consumed in the calciner so that the hot coke introduced from the calciner to the reactor consists essentially of only carbon and ash. If desired the coal may be previously coked for the recovery of by-product materials and the resulting coke may be employed in my system. Any carbon-containing material may be employed instead of coal, but coal is preferred because of its abundance and low cost.

By employing a U-shaped or elongated calciner the temperature of the fluidized mass is increased from approximately 1000° F. or lower to about 1600° F. as the solids flow from the inlet to the outlet end, the high temperature prevailing throughout at least a substantial part of the calciner. The depth of the dense phase solids in the calciner is preferably shallow, particularly when the temperature thereof reaches high levels because high temperatures favor the reaction $$CO_2 + C \rightarrow 2CO$$

If the dense phase depth were such that the reaction reached equilibrium only a very small amount of the theoretical air could be injected below the bed without causing excessive gasification and consumption of coal by the carbon dioxide liberated from the calcium carbonate. By employing a bed depth of only about 1 to 3 feet, e. g. about 2 feet, and by introducing only a part of the air, e. g. about ¼ to ⅔ or about ½ at the bottom of the bed I avoid undue carbon monoxide production and coal consumption.

The hot fluidized solids at a temperature of about 1600° F. are transferred to the reactor through a conduit which provides a seal between these two zones, a gas-lift being employed to effect the transfer when the pressure head of fluidized solids is insufficient. This conduit may be provided with heat exchange means and the excessive heat content of the solids may be utilized for preheating incoming charge materials particularly air. However, most of the heat liberated by cooling the solids from 1600 to 1000° F. is utilized for effecting the endothermic conversion of carbon with steam to produce hydrogen, vaporizing the introduced water to steam and superheating the steam to conversion temperature. By maintaining a relatively deep bed of fluidized solids in the reactor and maintaining the solids in dense phase turbulent condition the entire bed may be maintained at a substantially constant uniform temperature with the heat of the incoming solids supplying a part of the heat of conversion. A major part of the heat of conversion may be supplied by the conversion of calcium oxide to calcium carbonate which reaction removes produced carbon dioxide from the system and may substantially eliminate both carbon dioxide and carbon monoxide from the product gases (carbon monoxide being converted to carbon dioxide as fast as the latter is removed). The dense fluidized solids phase in the reactor is preferably about 5 to 20 feet in depth and it should be of sufficient depth to effect the desired conversion and to produce a gas of low carbon dioxide content. In order to prevent build-up of ash in the system a portion of the solids is continuously or intermittently removed from the reactor, the remainder of the solids being returned through a conduit which serves as a seal for introduction to the calciner along with make-up limestone and coal.

My invention may also be utilized for the production of hydrogen-carbon monoxide mixtures valuable as a synthesis gas charge for the synthesis of hydrocarbons, alcohols and other products by means of the Fischer-Tropsch, Synthol or other known synthesis reactions employing catalyst of the cobalt or iron type. For the production of such hydrogen-carbon monoxide synthesis gas my reactor may be operated at somewhat higher temperature, e. g. about 1250 to 1350° F. instead of 1000° F. and the calcium oxide circulation from the calciner will be limited to an amount insufficient to absorb all of the CO₂ produced. The product gas in such an operation can be made to contain hydrogen and carbon monoxide in approximately 2:1 ratio with not more than about 7% of CO₂ present. With the higher reactor temperature and the lower carbon dioxide absorption in the reactor it is necessary to supply more heat to the reactor; this can be accomplished by increasing the solids circulation from the calciner and/or by using steam for the reaction instead of water.

Figure 3:
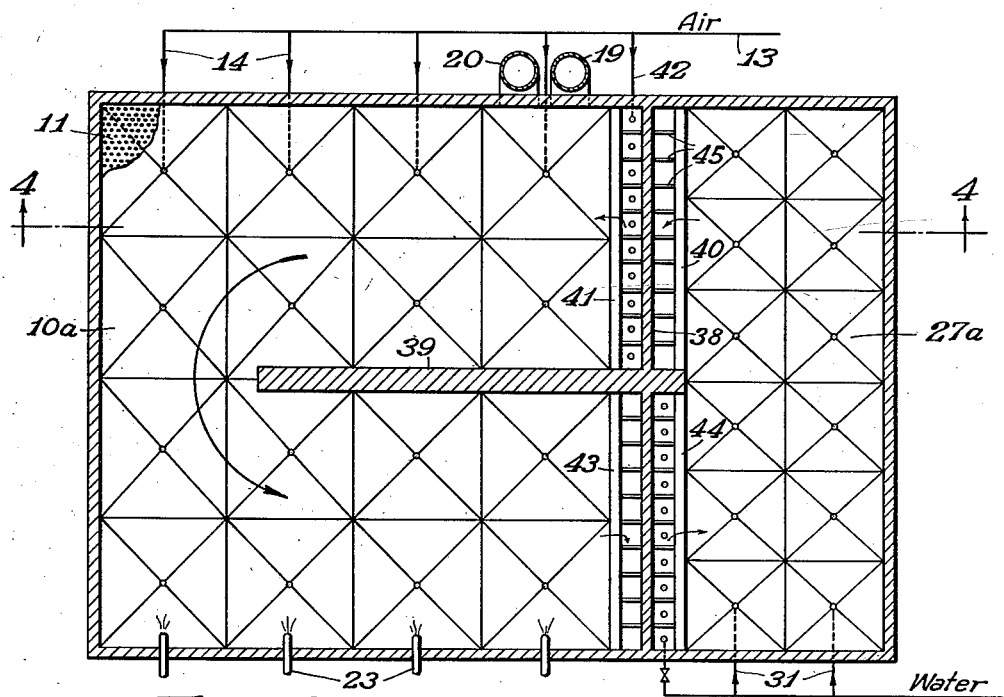
Figure 4:
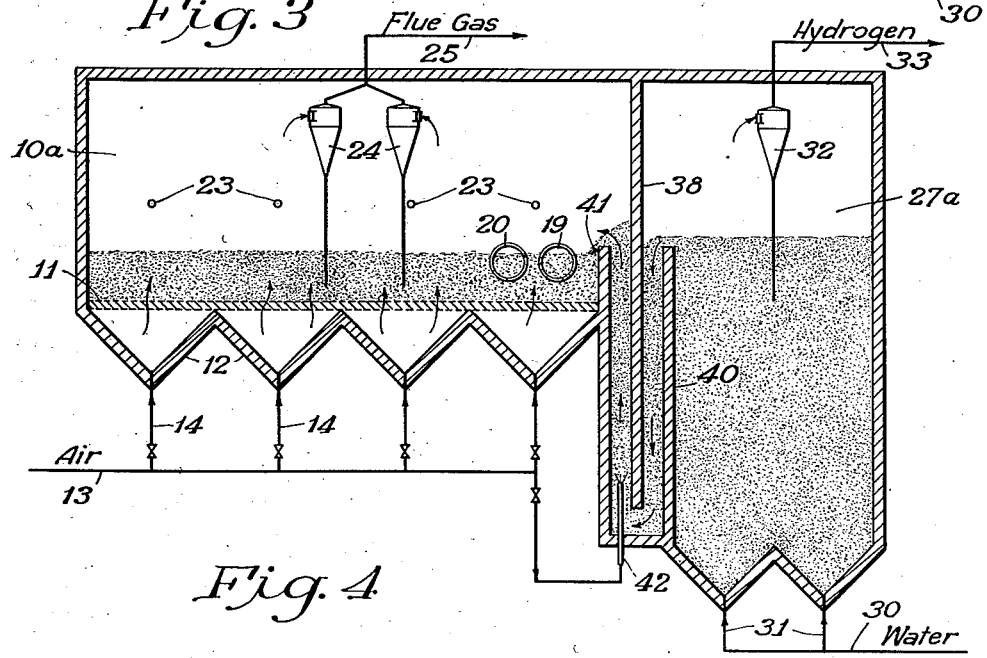

My invention will be more clearly understood from the following detailed description of specific embodiments of my apparatus and a specific example of my operation. In the accompanying drawings which form a part of the specification Figure 1 is a schematic horizontal section illustrating the circulating solids flow through a calciner and a separate reactor, Figure 2 is a vertical section illustrating flow to and from the reactor, Figure 3 is a schematic horizontal section through a modified reactor-calciner system of the box-type, and Figure 4 is a vertical section of the box-type system taken along the lines 4—4 of Figure 3.

Figure 2:
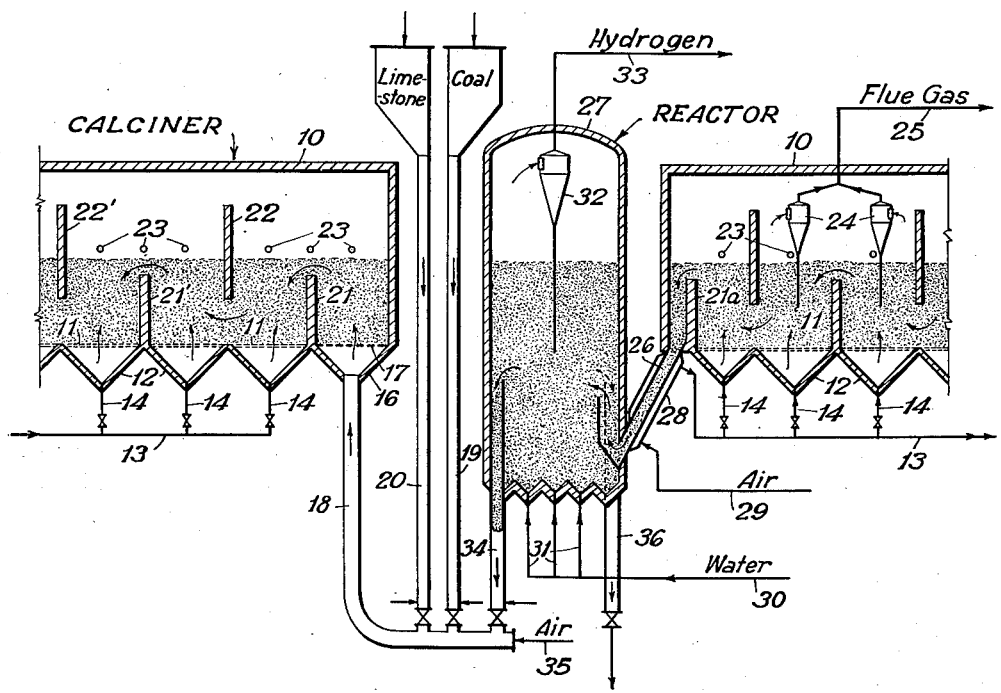

Referring first to the structure illustrated in Figures 1 and 2, the calciner 10 is preferably a U-shaped chamber. In this particular example the horizontal area or floor space of the calciner is about 250 square feet and the calciner may be about 10 feet in width separated into 5-foot channels by a central baffle and about 25 feet in length (total channel length being about 50 feet). The floor of the calciner consists of plates 11 of refractory material such as terra cotta, Aloxite, or the like and it may be assembled and supported in any known manner by the use of materials which will withstand high temperatures of the order of at least 1600° F. The floor plates may be porous, or may be provided with spaced distributor holes, which may be about ½ inch holes spaced to give a pressure drop of about one pound across the plate. Distributors 12 may be spaced side by side under the entire floor area each hopper serving to distribute air from line 13 and branch lines 14 through the portion of the porous plate which it covers. A single distributing zone may of course be employed instead of the plurality of hoppers shown in the drawing. In the drawings each portion is approximately 25 square feet but it will be understood that such distributors may cover an area of only a few square feet. The end zone 15 of the calciner is not provided with a porous plate but is provided with a hopper bottom 16 and a distributor grid 17 for the introduction of solids as well as gases. Grid 17 may be a plate of porcelain or other heat-resistant material having about 3 or 4 two-inch openings for each square foot of area, the purpose of this distributor plate or grid being to prevent channeling of the introduced gas stream and to provide uniform solids distribution.

A suspension of hot recycled solids in air is introduced at the base of hopper bottom 16 through conduit 18 along with powdered coal introduced from standpipe 19 and powdered limestone introduced through standpipe 20, each of these standpipes being provided with suitable slide valves for controlling rate of flow and aeration means for maintaining the solids in the standpipe in fluent liquid-like form. The introduced solids flow from the zone above distributor 17 over baffle 21, then under baffle 22, over baffle 21', under baffle 22', etc. until it has traversed the entire length of the calciner. During its flow it is maintained in dense fluent condition by the introduction of air from line 13, branch lines 14, and distributors 12. Additional air is introduced through opening or tuyères 23 for burning carbon monoxide to carbon dioxide and heating the flowing solids by radiant heat. The final flue gases may be passed through cyclone separators 24 for knocking back any entrained solids and thence removed from the calciner through line 25. These hot gases may be employed for preheating the lime, coal and/or air which is charged to the system but they are preferably employed for generating and superheating steam. Baffles 21, 22 etc. and cyclone separators 24 must of course be fabricated from refractory brick or other materials which will withstand temperatures of at least 1600° F. It will be noted that baffles 22 are spaced from the floor of the calciner or provided with openings adjacent the floor and that both baffles are spaced from the top of the calciner; the use of such baffles is not always necessary. The roof of the calciner may be dome-shaped and self-supporting. Since no invention is claimed in the structural details no further description thereof is necessary.

The solids which flow over final baffle 21a pass downwardly through standpipe 26 to the lower part of reactor 27. Standpipe 26 may be provided with jacket 28 in which a fluid may be introduced through line 29 and withdrawn through line 13 for removing the excessive heat from the transfer solids. Either the air stream introduced through line 13 or through openings 23 may thus be preheated or such excessive heat may be utilized for other purposes. The bottom of reactor 27 is preferably at least 4 feet and may be 10 or 15 feet lower than the bottom diffusor plate walls 11 of calciner 10 thus providing a head of fluidized solids in standpipe 26 which with the baffle provides the necessary seal between the reactor and calciner. Standpipe 26 or the upper part thereof may be of sufficient diameter to serve as a stripping chamber and a small amount of steam may be introduced into the standpipe to displace from the solids any undesired gases which might otherwise be carried into reactor 27.

Reactor 27 may be a cylindrical vessel about 10 feet in diameter by about 12 to 15 feet or more in height. Its base is preferably provided with hopper-shaped depressions into the base of which water is introduced through line 30 and branch lines 31, preferably through spray nozzles to provide for rapid vaporization without undue wetting of solids. The water is immediately converted into steam which passes upwardly through the reactor for maintaining the solids in dense phase turbulent suspension and for reacting with the hot coke to form hydrogen and carbon dioxide, the latter combining with the calcium oxide to form calcium carbonate. The gaseous stream is taken overhead through cyclone separator 32 for knocking back entrained solids and the final hydrogen product is removed through line 33.

A portion of the solids is continuously withdrawn from the dense phase in the reactor through standpipe 34, is picked up with air from line 35 and conveyed by line 18 back to the calciner. Another part of the solids is continuously withdrawn from the reactor through discharge line 36. If it is not expedient to remove the necessary amount of heat from introduced solids by heat exchange with standpipe 26, solids may be withdrawn from the reactor, passed through an external cooler and returned to the reactor in a manner disclosed in U. S. Patent 2,337,648 for controlling regeneration temperature in a catalytic cracking process. It should be understood that instead of introducing the coal and lime through hopper 16 and distributor 17 along with recycled solids through conduit 18, the recycled solids, coal and lime may all be introduced into the calciner in the same way that solids are introduced from standpipe 26 into the reactor. In other words, a porous diffusor plate may be employed instead of distributor 17 and solids may be introduced above this diffusor plate by a conduit leading directly from the solids phase in reactor 27. Such conduit may be U-shaped or suitably baffled in order to provide a seal to prevent transfer of gases between the reactor and the calciner.

In Figures 3 and 4 I have illustrated a somewhat simpler type of reactor-calciner system wherein both the calciner and the reactor are used in a single box-type unit. The calciner section 10a in this specific example may be about 15 feet from dividing baffle 38 to the opposite end wall and about 18 feet from side to side thereby providing about an 8 or 9 foot channel for the flow of fluidized solids through the calciner around longitudinal baffle 39. The reactor section 27a extends downwardly to a lower level than the calciner as shown in Figure 4 so that the depth of the fluidized solids in the reactor is greater than in the calciner. Transfer of solids from the reaction side 27a is effected by permitting the solids to flow over baffle 40, pass downwardly as an aerated column and under baffle 38 and thence upwardly over baffle 41, such flow being expedited by the injection of a gas stream such as air through line 42 to give a gas-lift effect.

Similarly, solids are transferred from the calciner to the reactor by flowing over baffle 43, downwardly as an aerated column under baffle 38 and thence upwardly over baffle 44 with the introduction of steam or gas to provide a gas-lift effect on the upflow side. In order to prevent lateral flow or surging in the upflow and downflow conduits on each side of baffle 38 I may employ spaced baffles 45 extending clear to the bottom of the U-shaped conduit which is provided by baffles 40 and 41 for example so that the flow of solids around the bottom of baffle 38 is effected in a plurality of separate conduits instead of in the relatively wide trough. The system of Figures 3 and 4 operates substantially the same way as the system described in connection with Figures 1 and 2 and further description thereof is therefore unnecessary.

The system of the size hereinabove described may be employed for producing about 2,400,000 cubic feet per day of hydrogen (measured at 0° C. and 1 atmosphere pressure), using a typical Illinois bituminous coal which contains about 6.7% of moisture and 6.3% ash and which on a moisture and ash-free basis contains about 80.6% carbon, 5.4% hydrogen, 9.9% oxygen, 1.8% nitrogen and 2.3% sulfur said coal having a heating value of about 12,900 B. t. u. per gross pound as received. Such process requires about 55 to 60 tons per day of such coal (a little over 50 tons per day on a moisture and ash-free basis), about 55 to 60 tons per day of water and about 285 tons per day or 7½ million cubic feet per day of air and about 15 tons per day of limestone. In starting up the process an excessive amount of coal or other fuel is employed to bring the system up to conversion temperature conditions which in this specific example is 1600° F. in the calciner and 1000° F. in the reactor. A separate flue-gas generator may be employed for such start-up operations and hot flue gas may be blown through the solids in both chambers until ignition temperature is reached. When conversion conditions have thus been established the charge materials are introduced in amounts above specified and solids are continuously or intermittently removed through conduit 36 at the rate of about 18 tons per day, said 18 tons being comprised of about 3.8 tons of calcium oxide, 9.5 tons of calcium carbonate, 3.6 tons of ash and 1.1 tons of coke. The flue gas consists chiefly of carbon dioxide and nitrogen with lesser amounts of steam and small amounts of sulfur dioxide and oxygen. The net product of about 2½ million cubic feet of hydrogen will contain small amounts of steam but negligible amounts of carbon monoxide, carbon dioxide, nitrogen, $H_2S$ and methane.

The vertical gas velocity through the fluidized solids in both the reactor and the calciner will be within the approximate range of 0.3 to 3 feet per second and preferably within the approximate range of 0.5 to 1.5 feet per second. About 20,000 to 25,000 pounds per hour of solids are transferred from the calciner to the reactor and from the reactor back to the calciner. The solids introduced from the calciner at about 1600° F. through standpipe 26 may consist of about 55 weight percent calcium oxide, 25 weight percent ash and 20 weight percent coke. The solids transferred from reactor to calciner by conduit 18 may contain about 21 weight percent calcium oxide, 53 weight percent calcium carbonate, 20 weight percent ash and 6 weight percent coke. To the material thus transferred from the reactor to the calciner are added about 4800 pounds per hour of coal and 1250 pounds per hour of limestone.

As hereinabove stated, only about half of the air is introduced through the diffusor or perforated plates which form the floor of the calciner for example about 40 cubic feet per second measured at standard conditions. This air when heated to the calciner temperature is sufficient to give a vertical velocity in the calciner upwards of 0.5 foot per second and due to the increase of gas volume due to combustion the vertical gas velocity through the fluidized solids bed will be in the range of about 0.5 to 1.5 foot per second. The rest of the air introduced above the dense solids level effects secondary combustion of the carbon monoxide in the upper part of the calciner so that the temperature above the fluidized solids may be of the order of about 2000 to 2500° F. The radiant heat from the secondary combustion effects calcination of the limestone and a preheating of the solids to 1600° F. without the undue consumption of coal and excessive production of carbon monoxide which would result if all the air were introduced at the base of the calciner.

In the particular example herein set forth the entire system is operated at about atmospheric pressure, a slight vacuum being maintained in the calciner by the flue gas stack and a corresponding vacuum being maintained in the upper part of the reactor by a suction fan for withdrawing the hydrogen product.

In the specific example hereinabove set forth I have described the application of my invention for the production of substantially pure hydrogen. My invention is also applicable for the generation of hydrogen-carbon monoxide mixtures for use as synthesis gas for the production of hydrocarbons and organic chemicals by catalytic processes employing cobalt-type and iron-type catalysts and generally known to the art as the Fischer process, Fischer-Tropsch process, Synthol process, etc. For producing a synthesis gas of 2:1 hydrogen-to-carbon monoxide ratio, the reactor may be operated at about 1250 to 1350° F. and the calcium oxide circulation from the calciner will be limited to an amount insufficient to absorb all of the carbon dioxide produced. My synthesis gas may therefore contain about 5 to 10% of carbon dioxide as well as hydrogen and carbon monoxide but this is not a serious disadvantage in most syntheses. The calcining step in this case may be somewhat higher, i. e. about 1800 to 2000° F. or more. To supply the necessary heat for producing the synthesis gas at a temperature of 1300° F. I employ a larger amount of circulating solids containing increased quantities of coal or coke and decreased quantities of calcium oxide and calcium carbonate. Alternatively or in addition to the modified amount and composition of recycled solids I may utilize the heat contained in flue gas from the calciner for vaporizing the water introduced into the reactor and superheating said vapors prior to their introduction into the reactor.

While I have described in considerable detail specific modifications of my system and specific operating conditions therefor, it should be understood that these examples are by way of illustration and not by way of limitation since various other modifications and alternative operating conditions will be apparent from the above description to those skilled in the art.

I claim:

1. The method of producing hydrogen which comprises continuously introducing solids of small particle size comprising calcium carbonate and coal into the inlet end of a calcining zone, continuously passing a gas upwardly in the calcining zone at such a vertical velocity as to maintain solids therein in dense phase suspension, heating said solids in the calcining zone for converting said calcium carbonate to calcium oxide, effecting at least a substantial part of the heating in the calcining zone by secondary combustion of gases which have passed through the dense solids phase with air introduced above the dense solids phase flowing the dense phase solids suspension through a horizontal path substantially longer than its width during the heating step continuously introducing hot solids comprising calcium oxide and carbon from the outlet end of the calcining zone to a reaction zone, continuously passing a gasiform stream comprising steam upwardly in said reaction zone at such velocity as to maintain solids therein in dense phase suspension and under conditions for effecting reaction of carbon with steam in the presence of said calcium oxide to produce hydrogen and calcium carbonate and continuously returning solids including calcium carbonate from the reaction zone to the calcining zone.

2. The method of claim 1 which includes the steps of maintaining a dense phase depth in the calcining zone within the approximate range of 1 to 3 feet and a dense phase depth in the reaction zone of at least 5 feet.

3. The method of claim 1 wherein the coal is of substantial ash content which method includes the step of continuously removing at least two solids streams from the reaction zone of which one is returned to the calcining zone and the other is withdrawn from the process in amounts sufficient to prevent excessive ash accumulation.

4. The method of claim 1 which includes the step of heating the solids in the calcining zone to a temperature sufficiently higher than the temperature in the reaction zone so that the sensible heat liberated by solids introduced into the reaction zone from the calcining zone plus the heat liberated by the production of calcium carbonate from calcium oxide in the reaction zone is sufficient to effect the reaction of carbon with steam in the reaction zone at substantially uniform temperature.

5. The method of producing hydrogen which comprises continuously introducing solids of small particle size comprising calcium carbonate and a carbon-containing material into the inlet end of a calcining zone, continuously passing an oxygen-containing gas upwardly in the lower part of the calcining zone at such a vertical velocity as to maintain the solids therein in dense phase suspension while effecting primary combustion of carbon to form carbon monoxide, introducing additional oxygen-containing gas at a level in the calcining zone which is above the dense phase solids whereby at least a substantial part of the heating in the calcining zone is effected by secondary combustion of gases which have passed through dense solids phase with said oxygen-containing gas introduced above the dense solids phase, supplying sufficient heat by said primary and secondary combustion to increase the temperature of the solids in the calcining zone to a temperature in the range of about 1400° F. to about 2100° F. while continuously flowing the dense phase solids suspension through a horizontal path substantially longer than its width and while maintaining the depth of the dense solids phase in the range of approximately 1 foot to 3 feet, thereby converting the calcium carbonate to calcium oxide and storing sensible heat in the unconsumed heated solids, continuously introducing said heated solids comprising calcium oxide and carbon into a reaction zone, passing a gaseous stream comprising steam upwardly in the reaction zone at a velocity sufficient to maintain the solids therein in dense phase condition and through a sufficient mass of solids and at such temperature as to effect reaction between steam and carbon to form hydrogen and carbon dioxide and to effect the formation of calcium carbonate from the calcium oxide and the produced carbon dioxide, the heat liberated in exothermic calcium carbonate formation supplementing the sensible heat given up by the heated solids to supply the heat of carbon-steam conversion, separating solids from the product stream withdrawn from the upper part of the reaction zone, withdrawing from the process a part of the solids from the dense phase in the reaction zone, returning another part of the solids from the dense phase in the reaction zone to said heating step for admixture with make-up calcium carbonate and carbon-containing material introduced to said heating step.

6. The method of claim 5 which includes the steps of maintaining the reaction zone at a temperature in the range of 800 to 1200° F. and employing a sufficient amount of calcium oxide in the reaction zone to remove substantially all carbon dioxide formed therein and whereby the net product stream consists essentially of hydrogen.

7. The method of claim 5 which includes the steps of maintaining the reaction zone at a temperature upwards of 1200° F. but not substantially higher than 1350° F. and employing an insufficient amount of calcium oxide in the reaction zone to combine with all produced carbon dioxide whereby the final gaseous product stream consists essentially of a hydrogen-carbon monoxide mixture of small carbon dioxide content.

8. The method of claim 5 which includes the step of introducing liquid water at the base of the reaction zone and supplying sufficient heat in the introduced hot solids and the exothermic calcium carbonate formation step to vaporize the introduced water and heat the vapors to reaction temperature as well as to effect the steam-carbon reaction.

9. The method of producing hydrogen which comprises introducing calcium carbonate of small particle size and a carbon-containing material into a calcining zone, maintaining a fluidized mass of solids of small particle size in said calcining zone by passing a gas upwardly therethrough at a velocity within the approximate range of 0.3 to 3 feet per second, flouring said fluidized mass of solids as a shallow dense phase suspension through a horizontal path which is substantially longer than its width, heating said fluidized solids by primary combustion effected by burning carbon with oxygen to produce carbon monoxide and secondary combustion by the burning of said carbon monoxide with additionally introduced oxygen in said calcining zone to convert the calcium carbonate to calcium oxide and to bring the temperature of the fluidized solids within the range of about 1400 to about 1800° F., introducing fluidized solids from said calcining zone to a reaction zone, maintaining a bed of fluidized solids at least about 5 feet in depth in the reaction zone at about atmospheric pressure passing steam upwardly in said reaction zone at a vertical velocity within the approximate range of 0.3 to 3 feet per second and at a temperature for effecting reaction of said steam with carbon to form hydrogen and carbon dioxide and to effect removal of at least a part of said carbon dioxide by chemical combination with said calcium oxide and separating solids from the product gas stream leaving the reaction zone.

JOSEPH F. COFFEY.

REFERENCES CITED

The following references are of record in the file of this patent:

UNITED STATES PATENTS

| Number | Name | Date |
| --- | --- | --- |
| 1,687,118 | Winkler | Oct. 9, 1928 |
| 1,984,380 | Odell | Dec. 18, 1934 |
| 2,200,607 | Stryker | May 14, 1940 |
| 2,268,910 | Stryker | Jan. 6, 1942 |
| 2,419,245 | Arveson | Apr. 22, 1947 |
| 2,480,639 | Ferguson | Aug. 30, 1949 |
| 2,482,187 | Johnson | Sept. 20, 1949 |

FOREIGN PATENTS

| Number | Country | Date |
| --- | --- | --- |
| 115,689 | Australia | Aug. 6, 1942 |
| 477,083 | France | June 28, 1915 |
| 632,466 | France | Oct. 10, 1927 |
| 284,816 | Germany | June 5, 1915 |
| 564,870 | Germany | Nov. 24, 1932 |
| 345,858 | Great Britain | Apr. 2, 1931 |

OTHER REFERENCES

Haslam et al.: "Fuels and Their Combustion," pp. 164–165.